(12) United States Patent
Rapowitz et al.

(10) Patent No.: US 11,948,144 B2
(45) Date of Patent: Apr. 2, 2024

(54) KNOWLEDGE-BASED AUTHENTICATION FOR ASSET WALLETS

(71) Applicant: Capital One Services, LLC, McLean, VA (US)

(72) Inventors: Samuel Rapowitz, Roswell, GA (US); Xiaoguang Zhu, New York, NY (US); Kevin Osborn, Newton Highlands, MA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 200 days.

(21) Appl. No.: 17/666,445

(22) Filed: Feb. 7, 2022

(65) Prior Publication Data

US 2023/0252456 A1 Aug. 10, 2023

(51) Int. Cl.
*G06Q 20/36* (2012.01)
*H04L 9/08* (2006.01)

(52) U.S. Cl.
CPC ....... *G06Q 20/3674* (2013.01); *H04L 9/0894* (2013.01); *G06Q 2220/00* (2013.01); *G06Q 2220/10* (2013.01)

(58) Field of Classification Search
None
See application file for complete search history.

(56) References Cited

U.S. PATENT DOCUMENTS

| 5,892,900 | A  | * | 4/1999  | Ginter    | G06Q 20/02 726/26   |
| 7,162,037 | B1 | * | 1/2007  | Schwenk   | H04L 9/0841 380/44  |
| 8,667,267 | B1 | * | 3/2014  | Garcia    | H04L 63/061 713/168 |
| 10,891,600 | B2 | * | 1/2021  | Rebernik  | G06Q 20/4014        |
| 11,132,673 | B1 | * | 9/2021  | Mikhaylov | G06Q 20/02          |
| 2006/0282681 | A1 | * | 12/2006 | Scheidt  | G06F 21/602 713/186 |

(Continued)

OTHER PUBLICATIONS

H. P. Singh, K. Stefanidis and F. Kirstein, "A Private Key Recovery Scheme Using Partial Knowledge," 2021 11th IFIP International Conference on New Technologies, Mobility and Security (NTMS), Paris, France, 2021, pp. 1-5, doi: 10.1109/NTMS49979.2021.9432642. (Year: 2021).*

(Continued)

*Primary Examiner* — Jacob C. Coppola
*Assistant Examiner* — Eduardo Castilho
(74) *Attorney, Agent, or Firm* — TROUTMAN PEPPER HAMILTON SANDERS LLP; Christopher J. Forstner; John A. Morrissett (57) ABSTRACT

Systems and methods for recovery access to lost blockchain wallet seed phrases are disclosed. The systems and methods can store seed phrases for users for future retrieval. In some examples, a decentralized oracle creates an oracle private key that can be used to authenticate a user who is requesting the seed phrase. In some examples, the oracle creates a private/public key pair that can be used to transmit and store an encrypted version of the seed phrase. The authentication steps described herein also include knowledge-based authentication questions about the wallet, e.g., prior transactions using the wallet, value of the wallet, and the like.

10 Claims, 7 Drawing Sheets

(56) References Cited

U.S. PATENT DOCUMENTS

| | | | |
|---|---|---|---|
| 2014/0020074 A1* | 1/2014 | White | G06F 21/36 726/5 |
| 2014/0283022 A1* | 9/2014 | Beloncik | G06F 21/32 726/19 |
| 2017/0048230 A1* | 2/2017 | Johansson | H04L 9/3271 |
| 2017/0103209 A1* | 4/2017 | Wooten | G06F 21/575 |
| 2018/0375648 A1* | 12/2018 | Huang | H04L 9/0662 |
| 2018/0375653 A1* | 12/2018 | Setty | H04L 9/3218 |
| 2019/0182042 A1* | 6/2019 | Ebrahimi | H04L 9/3234 |
| 2019/0229909 A1* | 7/2019 | Patel | G06F 21/6218 |
| 2019/0280863 A1* | 9/2019 | Meyer | G06F 7/08 |
| 2020/0076592 A1* | 3/2020 | Kong | H04L 9/0869 |
| 2020/0092097 A1* | 3/2020 | Chiu | G06Q 20/3678 |
| 2020/0193420 A1* | 6/2020 | Vogel | G06Q 20/3829 |
| 2020/0204361 A1* | 6/2020 | Fries | H04L 9/3271 |
| 2020/0251118 A1* | 8/2020 | Sunkavally | G06F 21/46 |
| 2021/0218566 A1* | 7/2021 | Mastenbrook | H04L 9/0825 |
| 2021/0266162 A1* | 8/2021 | Murdoch | G06F 21/32 |
| 2021/0344485 A1* | 11/2021 | Levin | G06F 21/602 |
| 2022/0094675 A1* | 3/2022 | Madisetti | G06Q 20/3829 |
| 2022/0141012 A1* | 5/2022 | Adams | H04L 63/068 713/193 |
| 2023/0025320 A1* | 1/2023 | McCarty | G06Q 20/3829 |
| 2023/0129705 A1* | 4/2023 | Wiklof | G06F 21/6245 726/26 |
| 2023/0318820 A1* | 10/2023 | Fooksman | G06F 21/31 713/184 |

OTHER PUBLICATIONS

Frymann, Nick, et al. "Asynchronous Remote Key Generation: An Analysis of Yubico's Proposal for W3C WebAuthn,", 2020, https://doi.org10.1145/3372297.3417292. (Year: 2020).*

Dalskov et al., Anders, et al. "2FE: Two-Factor Encryption for Cloud Storage," arXiv [Cs.CR], 2020, http://arxiv.org/abs/2010.14417.arXiv. (Year: 2020).*

* cited by examiner

KNOWLEDGE-BASED AUTHENTICATION FOR ASSET WALLETS

FIELD

The present disclosure relates generally to systems and methods for recovering access to digital wallets and, more particularly, to a decentralized oracle that stores and manages encryption keys and seed phrases for access retrieval.

BACKGROUND

Decentralized ledgers, such as blockchains, are important tools in the digital economy to manage digital assets. Blockchains can be used to manage any number of digital assets, from fine art to currency, the latter otherwise referred to as cryptocurrency. The benefits of blockchain technology include heightened trust in digital transactions, decentralization of transactions so that no single entity controls the environment, and increased security. The security comes, in part, by the fact that the entire record of a digital asset is memorialized and encrypted end-to-end.

A typical method of managing and encrypting the digital assets in a blockchain is to use a hierarchical deterministic wallet, which is a public/private key management tool. For example, a wallet can include (a) a master private key for generating a plurality of private keys to sign transactions and (b) a master public key for creating addresses for storing digital assets, which can be signed by corresponding private keys. The master private key is 256-bit key generated by another feature of the hierarchical deterministic wallet, a "seed phrase." The seed phrase is essentially the main key/password for the wallet and is in charge of creating the various private keys. For example, you can derive a master private key from a seed phrase, but you cannot derive a seed phrase from a master private key.

Because the seed phrase is such an important part of hierarchical deterministic wallets, remembering and maintaining the seed phrase is critical for keeping access to the wallet and assets therein. The seed phrase is a 12 to 24 word phrase, comprising random words selected from a list of 2,048 simple words such as bacon, coconut, dragon, rookie, etc. Use of words instead of numbers is intended to make the seed phrase more memorable, but merely memorizing the phrase is risky, since the consequence of forgetting the seed phrase is losing your assets.

To ensure access recovery of a forgotten seed phrase, blockchain participants will write their seed phrase down, for instance on a piece of paper. This method of recovery is not optimal, however, since someone can lose the copy of the seed phrase, and potential fraudsters can access a seed phrase if it is written down. Some users will break the seed phrase up into multiple parts and save those parts in separate locations. This method, however, is not user friendly and still provides a risk of losing the seed phrase. These and other problems exist when it comes to access recovery methods for seed phrases.

BRIEF SUMMARY OF THE INVENTION

Examples of the present disclosure provide solutions to the issues associated with seed phrase access recovery. The present disclosure describes a decentralized oracle that manages encryption keys and seed phrases for retrieval should a seed phrase be lost by a wallet user.

A method for recovering access to a wallet can include receiving a recovery request from a device to store a wallet private key and/or a seed phrase associated with the wallet. The method can include storing the wallet private key and/or the seed phrase. The method can include generating, for example by a random number generator an oracle private key associated with the wallet. The method can include transmitting the oracle private key to the device. The method can include receiving a recovery request to receive the wallet private key and/or the seed phrase from the device. The recovery request can include the oracle private key. The method can include accessing a decentralized ledger (e.g., a blockchain environment) that includes data indicative of activity of the wallet. The method can include identifying account information associated with one or more transactions completed by the wallet. The method can include transmitting to the device a request for confirmation that a client associated with the wallet completed the one or more transactions. The method can include receiving a confirmation that the client completed the one or more transactions. The method can include transmitting the wallet private key and/or the seed phrase to the device in response to the confirmation.

The confirmation that the client completed the one or more transactions can be in the form of an answer to a knowledge-based authentication question regarding account information associated with the wallet. The account information of the knowledge-based authentication question can include a total asset amount for the wallet, a total amount of a cryptocurrency within the wallet, a fiat currency value amount for assets in the wallet, information related to recent traded currency pairs, and/or information related to recent transaction types.

The decentralized oracle can also maintain assets associated with the wallet in order to release a seed phrase. For example, a user can transfer a predetermined amount/value of digital assets to the oracle. The oracle can hold these assets in escrow until the user needs to recover their seed phrase. Then, the oracle can release the seed phrase and deduct funds from the asset wallet it has held for the client.

A method for recovering access to a can include receiving, at one or more processors associated with a decentralized oracle, a recovery public key, an encrypted seed phrase, and a master public key associated with the wallet. The encrypted seed phrase can be encrypted with the recovery public key. The method can include storing the recovery public key, the master public key, and the encrypted seed phrase. The method can include receiving a recovery request from a device to receive the encrypted seed phrase. The recovery request can include an address associated with an address node. The method can include accessing a decentralized ledger including data indicative of activity of the wallet. The method can include identifying account information associated with the address. The method can include transmitting a knowledge-based authentication question based upon the account information. The method can include receiving an answer to the knowledge-based authentication question. The method can include comparing the answer with the account information. The method can include transmitting the encrypted seed phrase to the device.

A method for recovering access to a wallet can include generating, by one or more processors of a user device, a key pair including a recovery public key and a recovery private key. The method can include encrypting, by the one or more processors, a seed phrase with the recovery public key, thereby creating an encrypted seed phrase. The method can include transmitting, from the one or more processors, the recovery public key, the encrypted seed phrase, and a master public key associated with the wallet to a decentralized oracle. The method can include transmitting, from the one or more processors, a recovery request to the decentralized oracle to receive the encrypted seed phrase. The recovery request can include an address associated with an address node. The method can include receiving, at the one or more processors and from the decentralized oracle, a knowledge-based authentication question based upon account information associated with the address. The method can include transmitting, from the one or more processor and to the decentralized oracle, an answer to the knowledge-based authentication question. The method can include receiving, at the one or more processors, the encrypted seed phrase from the decentralized oracle.

These and other aspects of the present disclosure are described in the Detailed Description below and the accompanying figures. Other aspects and features of examples of the present disclosure will become apparent to those of ordinary skill in the art upon reviewing the following description of specific, exemplary examples of the present invention in concert with the figures. While features of the present disclosure can be discussed relative to certain examples and figures, all examples of the present disclosure can include one or more of the features discussed herein. Further, while one or more examples can be discussed as having certain advantageous features, one or more of such features can also be used with the various examples of the invention discussed herein. In similar fashion, while exemplary examples can be discussed below as device, system, or method examples, it is to be understood that such exemplary examples can be implemented in various devices, systems, and methods of the present invention.

BRIEF DESCRIPTION OF THE DRAWINGS

The accompanying drawings, which are incorporated in and constitute a part of this specification, illustrate multiple examples of the presently disclosed subject matter and serve to explain the principles of the presently disclosed subject matter. The drawings are not intended to limit the scope of the presently disclosed subject matter in any manner In the drawings.

DETAILED DESCRIPTION

Examples of the present disclosure generally include systems and methods for recovering access to digital wallets and, more particularly, to a decentralized oracle that manages encryption keys and seed phrases for access retrieval. A decentralized oracle is a program or entity that sits between off-chain programs and on-chain data, and operates smart contracts to share information about the on-chain and off-chain data between nodes. A benefit of the present systems and methods is that the decentralized oracle can review transactions happening within the block chain and leverage that information to enable users to recover lost seed phrases and/or private keys. In some examples, the oracle can maintain a separate encryption scheme to store seed phrases and/or private keys for users and release the phrases/keys upon certain triggers by the end user. These triggers can include receiving encryption keys from the user that is requesting the seed phrase and/or receiving answers to knowledge-based authentication questions from the end user.

Knowledge-based authentication questions can be used by the oracle to ensure a seed phrase is released to an actual owner of a wallet. For example, the end user may have forgotten their 24-word seed phrase to unlock their hierarchical deterministic wallet, but the user may very well remember certain information about their wallet, like how much cryptocurrency is stored in the wallet, the rough fiat-currency-value of the assets within the wallet, what types of transactions were recently performed, etc. The oracle can use this information to ensure the seed phrase is released to the correct person. Authentication steps are invaluable since access to a hierarchical deterministic wallet means access to all assets therein.

The knowledge-based authentication questions can form all or some of the authentication required to release a seed phrase. In some examples, the oracle can alternatively or in addition provide private keys, or oracle private keys, that can be stored on a user device in order to decrypt stored seed phrases. To illustrate, the oracle can receive a request to store a seed phrase. The oracle can create an oracle private key associate with the wallet in order to store the seed phrase and send that oracle private key to a user device. If the oracle receives a request from the user device to recover the seed phrase, the oracle can require (a) the oracle private key, (b) an answer to knowledge-based authentication questions, or (c) both, to authenticate the user who sent the request before providing the seed phrase. The oracle can also create an oracle public/private key pair, which can be stored on the user device. In this manner, the seed phrase can be encrypted end-to-end, i.e., encrypted before being sent to the user device so that a fraudster does not intercept the seed phrase before delivery to the intended, authorized user.

The systems and methods described herein are necessarily rooted in computer technology as they relate to digital security protocols to prevent or provide access to secured wallets. The entirety of the system is based upon blockchain technology, meaning the data is distributed among a plurality of end-user computers, which make up the nodes of the system. This environment is vastly different than a typical server/cloud system wherein one entity is in control of the information, keys, and transactions associated with system. Instead, the oracle herein is able to leverage known information, e.g., addresses provided by public keys, to retrieve and review prior transactions. The information is known to the oracle because of the encryption framework, not because the oracle maintains control over the data.

Reference will now be made in detail to exemplary examples of the disclosed technology, examples of which are illustrated in the accompanying drawings and disclosed herein. Wherever convenient, the same reference numbers will be used throughout the drawings to refer to the same or like parts.

Figure 1:
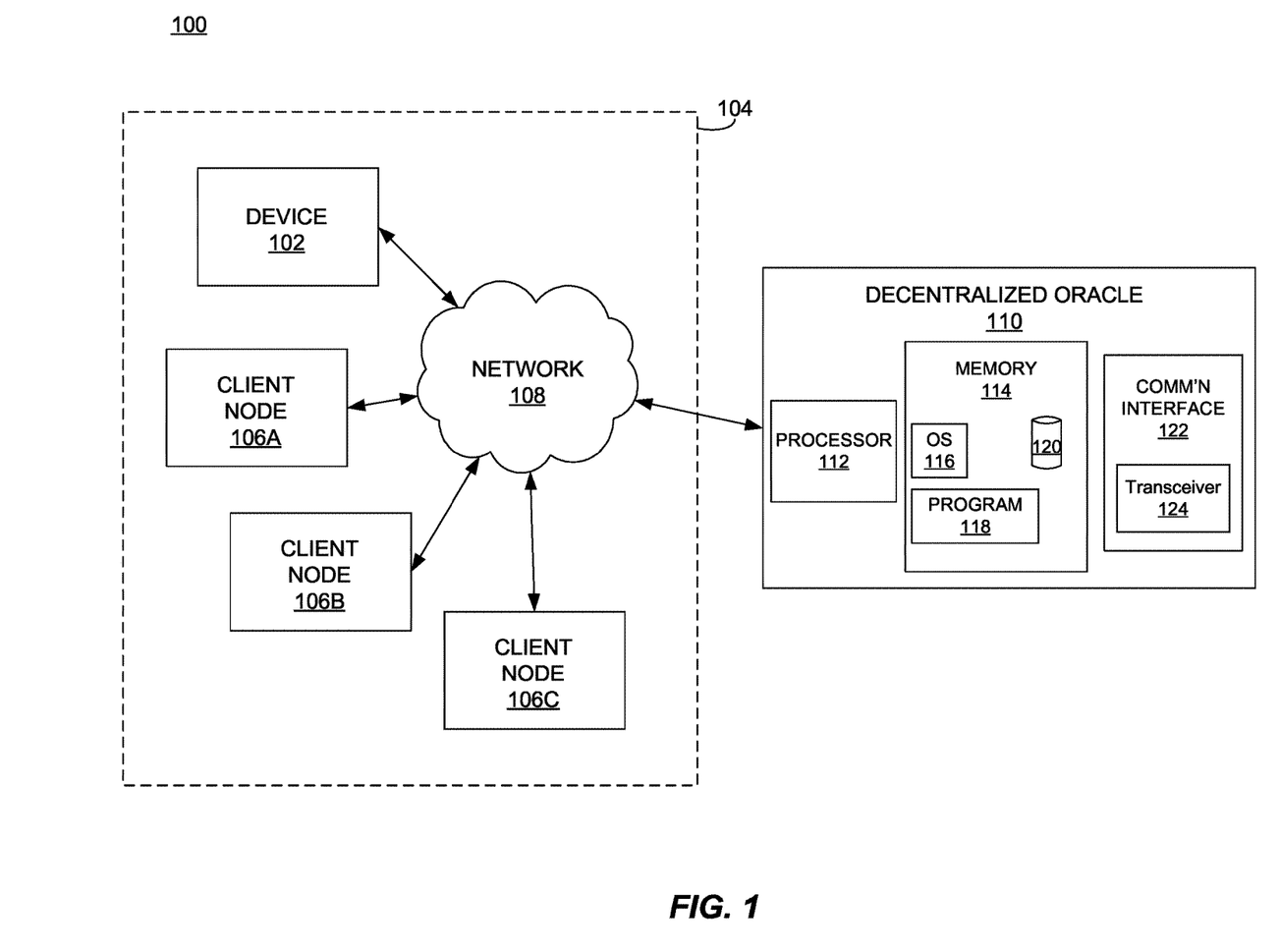
FIG. 1 is a diagram of an example system environment that can be used to implement one or more examples of the present disclosure.

FIG. 1 is a diagram of an example system environment 100 environment that can be used to implement one or more examples of the present disclosure. A more detailed explanation of the components of the system environment 100 is provided below. It is beneficial, however, to provide a brief overview to describe the components of the systems and methods for access recovery of seed phrases. The system environment 100 can include a user device 102 that is a component, or a node, of a blockchain 104. As will be appreciated, the blockchain 104 can comprise a plurality of nodes, such as client node 106A, 106B, and 106C. The user device 102 and other nodes can be a mobile computing device (e.g., a smart phone, tablet computer, smart wearable (e.g., a smart watch), portable laptop computer, voice command device, wearable augmented reality device, or other mobile computing device) or a stationary device (e.g., desktop computer), as will be described below with reference to FIG. 3. The other nodes of the blockchain can be similar to the user device 102, for example each of the nodes can be a personal computing device, or the other nodes can be other devices such as servers. The decentralized oracle 110 can sit outside the framework of the blockchain 104, as shown, and can review (e.g., read) data either outside or inside the chain and communication with seed-phrase requesting devices, i.e., user device 102.

The components/nodes of the blockchain 104 can communicate with the oracle 110 over a wired or wireless network 108. The network 108 can, therefore, facilitate transactions being made in the blockchain 104 (e.g., trades in cryptocurrency, etc.) between the nodes, and can facilitate communication of the oracle keys and seed phrases described herein. In some examples, the user device can operate a mobile application (e.g., mobile application 350) that is associated with the oracle 110. The oracle 110 can utilize the mobile application 350 to share the oracle public and/or private key with the user device 102, and the mobile application 350 can provide an ecosystem through which the user of the user device can request storage of the seed phrase and receive the seed phrase.

Figure 2:
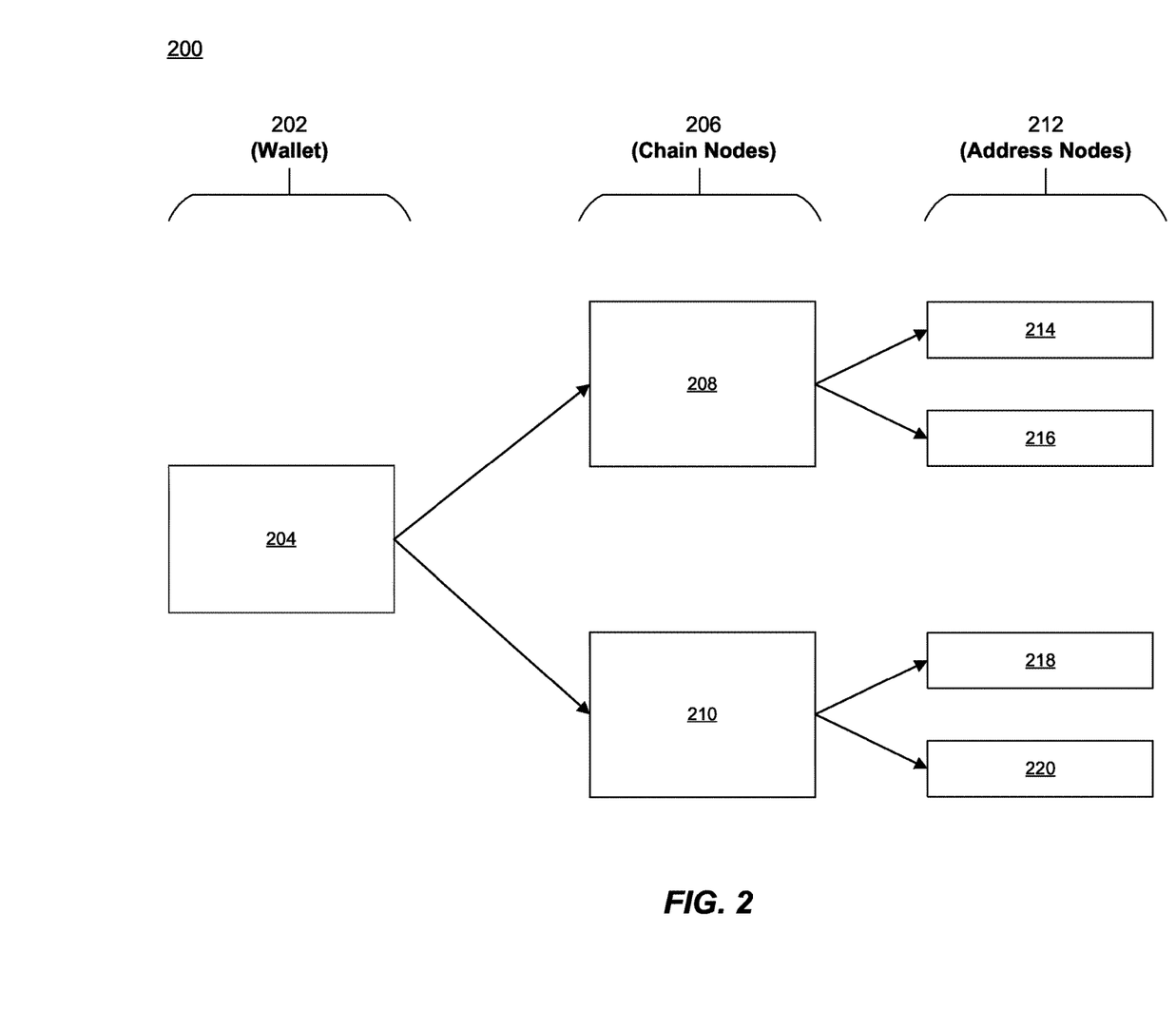
FIG. 2 is a diagram of an example blockchain wallet environment, according to the present disclosure.

FIG. 2 is a diagram of an example blockchain wallet environment, according to the present disclosure. A hierarchical deterministic wallet is a tree of public and private keys that are used to store data, such as cryptocurrency data. At the wallet 202 level, a seed phrase can generate a master private key 204, and the master private key 204 can generate additional branches of trees by generating private keys for use with signing a transaction. The chain node 206 branch includes the one or more private keys (e.g., key 208 and key 210) that can be used for signing transactions. The keys in the chain node 206 can be used to create address (e.g., addresses 214, 216, 218, and 220) in the address node 212. Addresses comprise the final location of particular assets and asset information. For example, an address can include a particular Bitcoin asset, including the ledger of prior transactions that accompanies that particular asset (e.g., prior trade information, etc.). Each of the addresses (e.g., addresses 214, 216, 218, and 220) can include a public key. If a user/entity has information about the public key, the address for that asset can be obtained. As will be described in greater detail below, the systems and methods described herein can leverage information about those addresses to generate knowledge-based questions to be used for user authentication.

Figure 3:
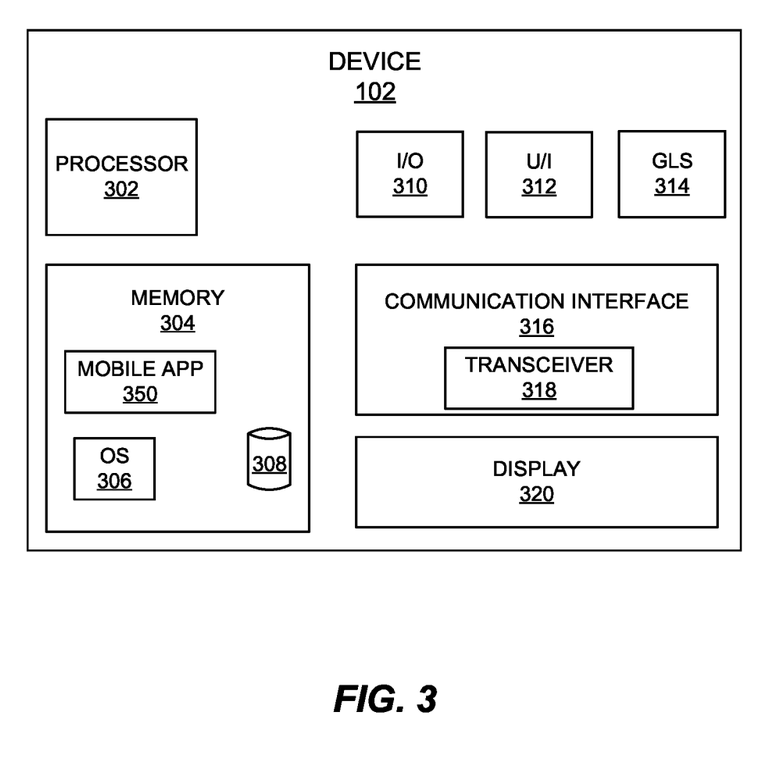
FIG. 3 is a component diagram of an example user device, according to the present disclosure.

FIG. 3 is a component diagram of an example user device, according to the present disclosure. The device 102 can be a mobile computing device (e.g., a smart phone, tablet computer, smart wearable (e.g., a smart watch), portable laptop computer, voice command device, wearable augmented reality device, or other mobile computing device) or a stationary device (e.g., desktop computer). The device 102 can include a processor 302 and a memory 304, operating system ("OS") 306, one or more programs (e.g., mobile application 350 described herein), and/or data storage 308. The device 102 can also include a communication interface 316 that includes a transceiver 318. The communication interface 316 and/or transceiver 318 can be used to transmit and/or receive the data described throughout this disclosure, including for example the requests to retrieve the seed phrase, the oracle private keys, the oracle public keys, and/or the like. The communication interface 316 can also facilitate communication, i.e., trades, via the blockchain 104 with other nodes, e.g., client nodes 106A, 106B, and 106C. Again, the client nodes 106A, 106B, and 106C can also be similar devices as the user device 102.

The device 102 can also include one or more input/output ("I/O") devices 310 that can include one or more interfaces for receiving signals or input from devices and providing signals or output to one or more devices that allow data to be received and/or transmitted by the device 102. For example, the device 102 can include interface components, which can provide interfaces to one or more input devices, such as one or more keyboards, mouse devices, touch screens, track pads, trackballs, scroll wheels, digital cameras, microphones, sensors, and the like, that allow the device 102 to receive data from one or more users.

The device 102 can also include a user interface ("U/I") device 312 for receiving user input data, such as data representative of a click, a scroll, a tap, a press, or typing on an input device that can detect tactile inputs. According to some examples, U/I device 312 can include some or all of the components described with respect to I/O device 310 above. The U/I device 312 can be defined as the "input" of the device 102. The device 102 can also include a GLS 314 for determining the geographic location of the device 102, including by using GPS data and cellular data, as described above.

The device 102 can include a display 320. The display 320 can provide visual representation of the applications (e.g., mobile application 350) and/or graphical user interfaces (GUIs) associated with those applications. The display 320 can also be a U/I device 312 in the case that the device 102 has touchscreen capabilities. In other words, in some examples the display 320 can be the "input" of the device 102.

Figure 4A:
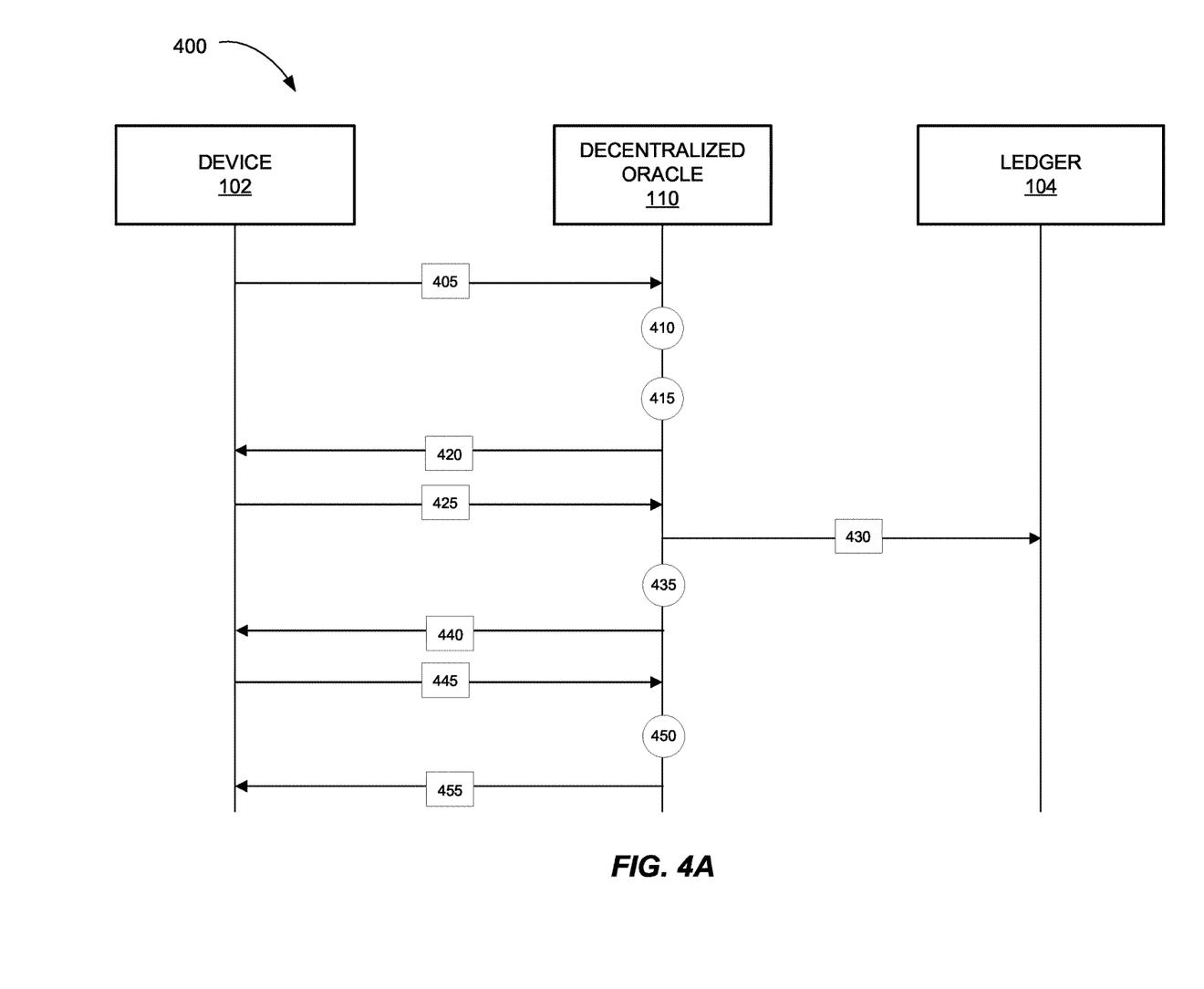
FIGS. 4A and 4B are timing diagrams of an example process for recovering access to a wallet, according to the present disclosure.
Figure 4B:
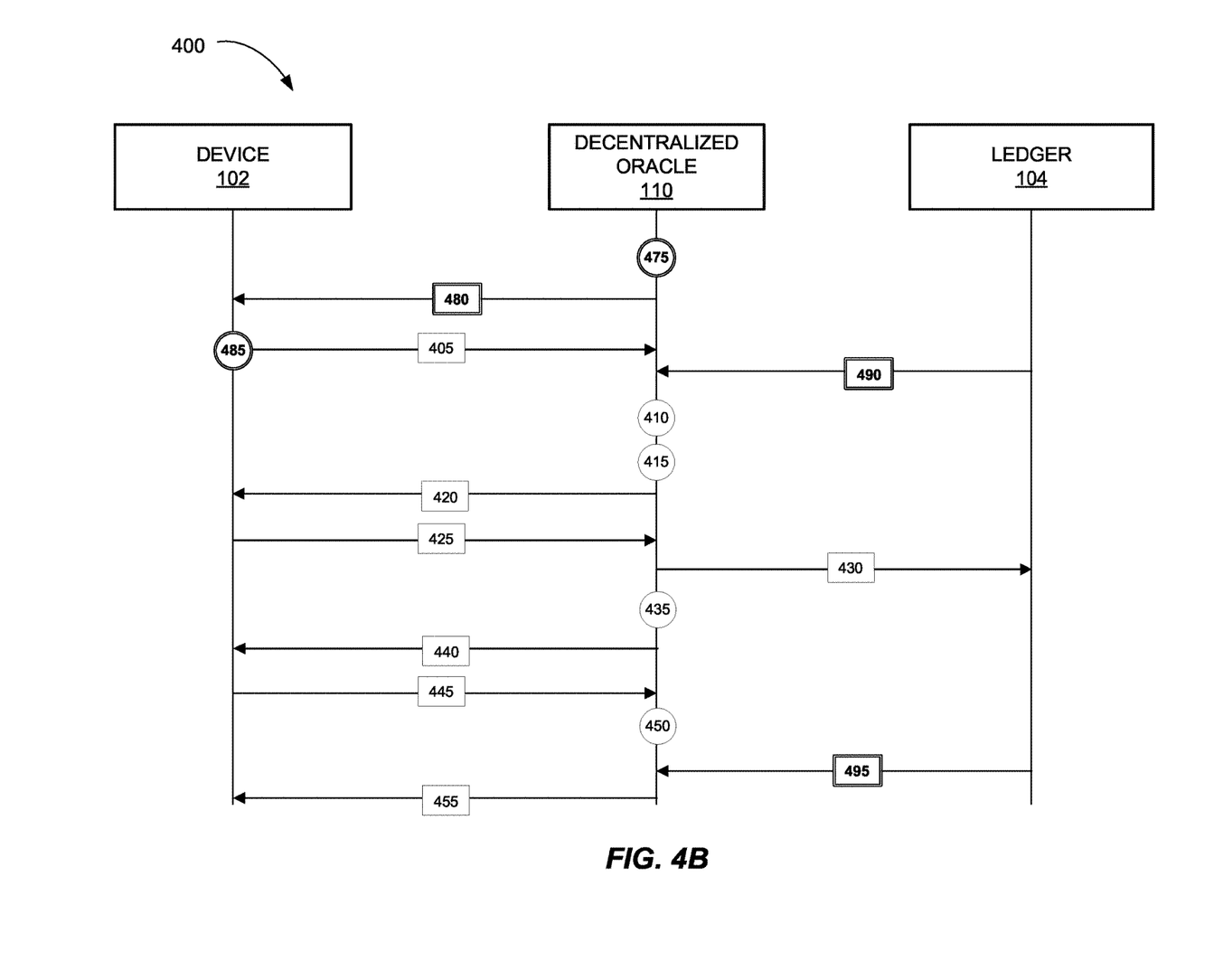

FIGS. 4A and 4B are timing diagrams of an example process 400 for recovering access to a wallet, according to the present disclosure. Referring to FIG. 4A, the process 400 can include the user device 102, the decentralized oracle 110, and a decentralized ledger (e.g., blockchain 104). The decentralized oracle 110 described in FIGS. 4A and 4B can perform one or more of the steps in the timing chart using a processor associated with the oracle 110 (e.g., processor 112). Referring to FIG. 4A, process 400 can begin with the oracle 110 receiving 405 a recovery request from a device to store a wallet private key and/or a seed phrase associated with the user wallet. As shown, the recovery request can be received from a user device 102, and can be generated, for example, by an application associated with the oracle 110 and operating on the user device 102. The recovery request can include the seed phrase, which can be a 12 to 24 word string for opening the user wallet. The recovery request can alternatively or in addition include a wallet private key (e.g., key 204) that is used to make private keys associated with the chains within the wallet (e.g., private keys 208 and 210).

After receiving the recovery request, the oracle 110 can store 410 the wallet private key and/or the seed phrase in a database (e.g., database 120). The oracle 110 can generate 415 an oracle private key associated with the wallet (e.g., wallet 202). The oracle private key can be separate from the master private key of the wallet or the private keys used within the wallet to sign transactions. The oracle private key can be used to encrypt information transferred between the oracle 110 and the user device 102, including the seed phrases transmitted for account recovery. In some examples, the private key can be created via a random number generator. The oracle 110 can transmit 420 the oracle private key to the device (e.g., user device 102) for use in recovery should the user of the associated wallet lose the seed phrase.

Process 400 can also include the steps required for access recovery, e.g., receiving a request from the device (e.g., user device 102) to retrieve the seed phrase from the oracle 110. Accordingly, the oracle 110 can receive 425 a recovery request to receive the wallet private key and/or the seed phrase. The recovery request can include the oracle private key generated and transmitted to the device in steps 415 and 420, respectively. At this point, the oracle 110 can review information related to the wallet that is being recovered. To do so, the oracle 110 can leverage the information about the account, which is information that can be used to authenticate the user. The oracle 110 can access 430 a decentralized ledger, e.g., blockchain 104, comprising data indicative of activity of the wallet. To do so, in certain implementations the recovery request can include a public key associated with addresses of particular assets/transactions within the wallet. In some examples, the public key is the master public key associated with the wallet, and the master public key can provide the oracle 110 read-only permission to all transactions (e.g., addresses) completed by the wallet. In other examples, the recovery request can include a plurality of addresses (e.g., one or more of addresses 214, 216, 218, and 220) that can be used to authenticate the user requesting recovery of the wallet. The oracle 110 can identify 435 account information associated with one or more transactions completed by the wallet.

The oracle 110 can then transmit 440, to the user device 102, a request for confirmation that a client associated with the wallet completed the one or more transactions. This step can include the knowledge-based authentication steps described herein. The request for confirmation can include questions about prior transactions using the wallet or about general information related to the wallet. This requested information can include information about a total asset amount for the wallet, a total amount of a cryptocurrency within the wallet, a fiat currency value amount for assets in the wallet, information related to recently traded currency pairs, information related to recent transaction types, and/or the like.

In one example, the request for confirmation can be a simple notification, sent to the application 350, for example, that requests yes/no confirmation from the user that a transaction was completed by the user. To illustrate, an example question can include, "Did the user of this wallet complete a trade for Bitcoin on or around Dec. 12, 2021?" Other questions are possible, such as, "Did the user of this account purchase cryptocurrency in the amount of $150 in December 2021?"

In other examples, the request for confirmation can include open-ended questions about the accounts in the wallet, which in turn ask specific questions that require specific answers to authenticate the user. To illustrate this example, the oracle 110 can transmit 440 a question asking, "What was the value of the most recent fiat currency used to trade for a sum of cryptocurrency?" As can be seen, this type of request for confirmation requires the user to input (e.g., into the application 350) the amount of fiat currency (e.g., US Dollars) spent to purchase an amount of cryptocurrency, which is an open-ended question. A response could be, for example, US $1050.00.

Process 400 can continue, and the oracle 110 can receive 445, from the user device 102, a confirmation that the client completed the one or more transactions. This confirmation can be the "yes/no" answers or it can be an answer to an open-ended question, as described above. In some examples, the oracle 110 can include a predetermined range that can give the answerer a degree of tolerance when answering. For example, the oracle 110 can receive, from the device 102, a predetermined range for comparing the answer with the account information. The predetermined range is a degree of tolerance between the answer and the actual asset amount for the wallet, the actual total amount of a cryptocurrency within the wallet, or the actual fiat currency value amount for assets in the wallet. To illustrate using the example above, "What was the value of the most recent fiat currency used to trade for a sum of cryptocurrency," the answer can have a predetermined range that will allow a range of answers to be correct. The range can be, for example, $100 above or below the actual value. If the actual answer is US $1050.00, the user can answer anything between US $950.00 and US $1150.00 and the oracle 110 will determine that the answer is correct.

Referring again to process 400, if the oracle 110 determines 450 that answer to the request for confirmation satisfies the request for confirmation, the oracle 110 can transmit 455 the wallet private key and/or the seed phrase to the user device.

Process 400 can end after the transmit 455 step. In other examples, additional steps for securing the access recovery process 400 can be performed by the system environment. Certain additional steps are shown in FIG. 4B. Blocks 405-455 of FIG. 4B are similar to those shown in FIG. 4A, whereas additional illustrative steps are sown in blocks 475-495. In one example, the oracle can generate 475 an oracle public key for storage on the device. The oracle public key can be transmitted 480 to the user device 102 and stored on the user device 102 for encrypting/decrypting the wallet private key and/or the seed phrase that is transmitted between the user device 102 and oracle 110. An encrypted wallet private key and/or an encrypted seed phrase can be decrypted using the oracle public key. The user device 102 can encrypt 485 the wallet private key and/or the seed phrase using oracle public key prior to sending the oracle, and can decrypt the wallet private key and/or the seed phrase using oracle public key when it receives it from the oracle.

In some examples of process 400, the oracle can generate a key pair comprising a recovery private key and a recovery public key. The recovery request can include an encrypted version of the wallet private key and/or the seed phrase encrypted using the recovery public key. The oracle can receive a master public key associated with the wallet along with the recovery request. The recovery request can include the encrypted version of the wallet private key and/or the seed phrase.

In some examples of process 400, the oracle 110 can set up a separate account that can be used to store assets to fund the access recovery processes. Stated otherwise, the oracle 110 can ask the user to stake certain assets in order to use the oracle recovery program. The oracle 110 can receive 490 wallet assets associated with the wallet. These assets can be received from the blockchain 104. For example, the user can allocate a certain value of cryptocurrency into a cache of wallet assets, which the oracle 110 can hold, e.g., in database 120, until a user needs to request the seed phrase recovery.

The oracle 110 can deduct 495 recovery assets from the wallet assets responsive to transmitting the wallet private key and/or the seed phrase in the transmit 455 step. In some examples, the oracle can maintain a wallet asset threshold which must be maintained in the wallet asset cache before the oracle transmits the wallet private key and/or the seed phrase to the user device 102. For example, the oracle 110 can maintain a $200 balance, meaning the assets in the wallet asset cache must be valued at over $200 or the oracle 110 will request additional assets be added to the wallet assets before it will continue storing the seed phrase for access recovery. In this manner, the decentralized oracle 110 can leverage the fact that it sits between off-chain programs and on-chain data, and operates smart contracts to share information about the on-chain and off-chain data between nodes. Say for instance the predetermined threshold for wallet assets is $200. The original value of assets in the asset wallet is $220, but the value of the particular cryptocurrency depreciates over time and the current value is $190, the oracle 110 can request additional assets. The oracle 110 can determine this value because the oracle 110 enables smart contracts to execute based on real-word, off-chain trading data.

Figure 5:
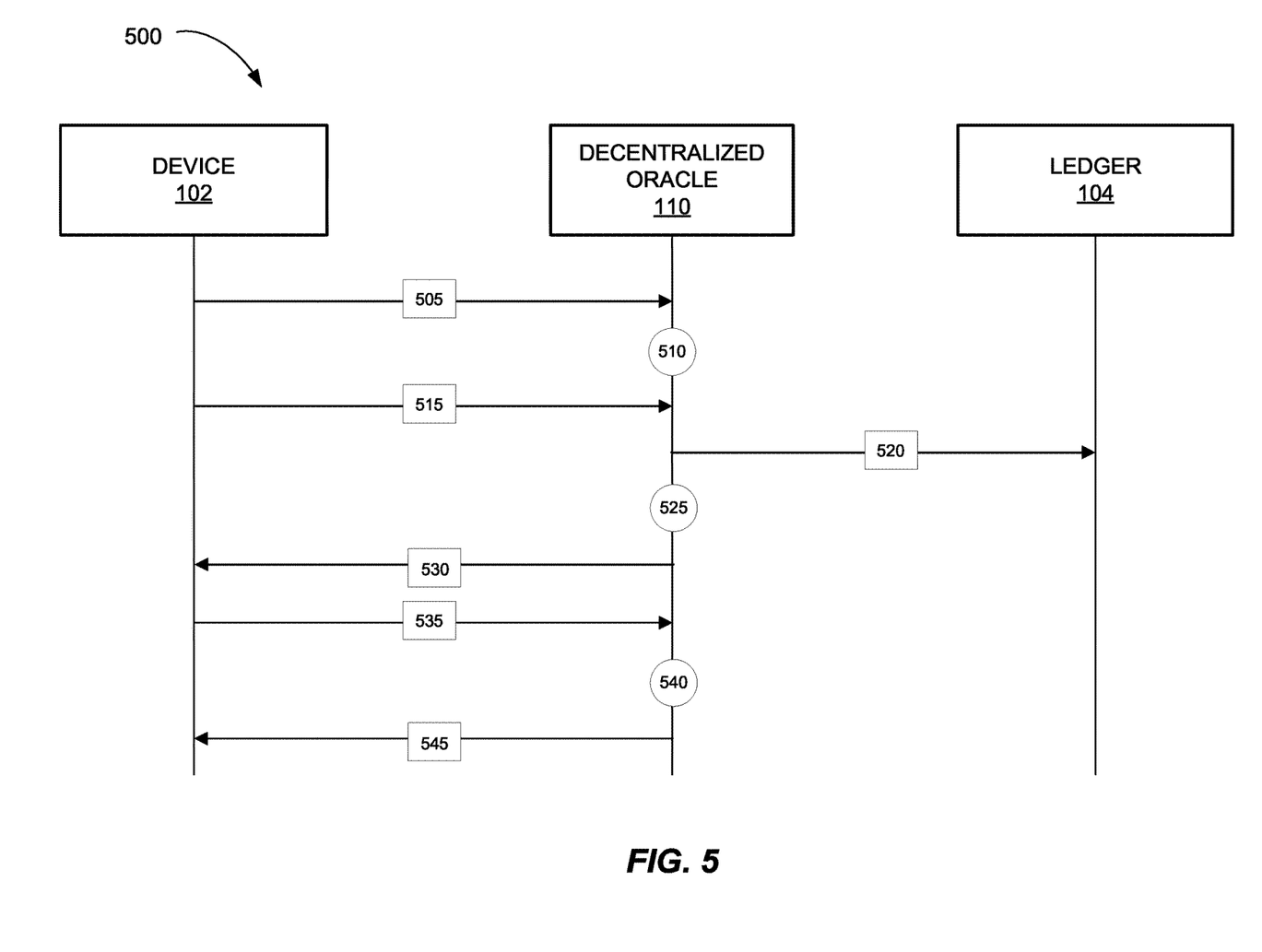
FIG. 5 is a timing diagram of another example process for recovering access to a wallet, according to the present disclosure.

FIG. 5 is a timing diagram of another example process 500 for recovering access to a wallet, according to the present disclosure. The process 500 shown in FIG. 5 leverages the ability to use the master public key of the wallet to identify addresses of assets, as described above. The process 500 also includes additional layers of encryption to ensure that the seed phrase is not vulnerable to intercept by a fraudster when transmitted between the user device 102 and the decentralized oracle 110. The decentralized oracle 110 described in FIG. 5 can perform one or more of the steps in the timing chart using a processor associated with the oracle 110 (e.g., processor 112). Referring to FIG. 5, process 500 can begin with the oracle 110 receiving 505, from a user device 102, a recovery public key, an encrypted seed phrase, and a master public key associated with the wallet. The encrypted seed phrase can be encrypted with the recovery public key. In some examples, the device 102 can operate an oracle application (e.g., application 350) associated with the decentralized oracle. The recovery public key can be associated with a recovery private key generated by the oracle application. The encrypted seed phrase can be configured to be decrypted by the recovery private key. The oracle 110 can store 510 the recovery public key, the master public key, and the encrypted seed phrase.

Process 500 can also include the steps required for access recovery, i.e., receiving a request from the device (e.g., user device 102) to retrieve the encrypted seed phrase from the oracle 110. The oracle 110 can receive 515 a recovery request from a user device to receive the encrypted seed phrase. The recovery request can include an address associated with an address node. The oracle 110 can access 520 a decentralized ledger comprising data indicative of activity of the wallet. This access 520 step can be similar to the access 430 step described above with reference to FIG. 4A. The oracle can then identify 525 account information associated with the address. This identify 525 step can be similar to the identify 435 step described above with reference to FIG. 4A.

To further authenticate the user to ensure a seed phrase is sent to the correct recipient, the oracle 110 can transmit 530 a knowledge-based authentication question to the user device based upon the account information. The knowledge-based authentication question can include information about a total asset amount for the wallet, a total amount of a cryptocurrency within the wallet, a fiat currency value amount for assets in the wallet, information related to recent traded currency pairs, information related to recent transaction types, and/or the like, as described above with reference to FIG. 4A. Further, the knowledge-based authentication question can include the tolerances, i.e., predetermined ranges for values that will constitute a correct answer to the question, described above. The oracle can receive 535 an answer to the knowledge-based authentication question from the user device.

The oracle can compare 540 the answer with the account information, and transmit 545 the encrypted seed phrase to the device. The device (e.g., user device 102) can decrypt the encrypted seed phrase using the recovery private key described above for step 505. Process 500 can end after the transmit 545 step, or other process steps can be included. For example, the oracle 110 can maintain a cache of assets to deduct if the user wishes to recover the seed phrase from the oracle, as described above in blocks 490 and 495 of process 400.

Figure 6:
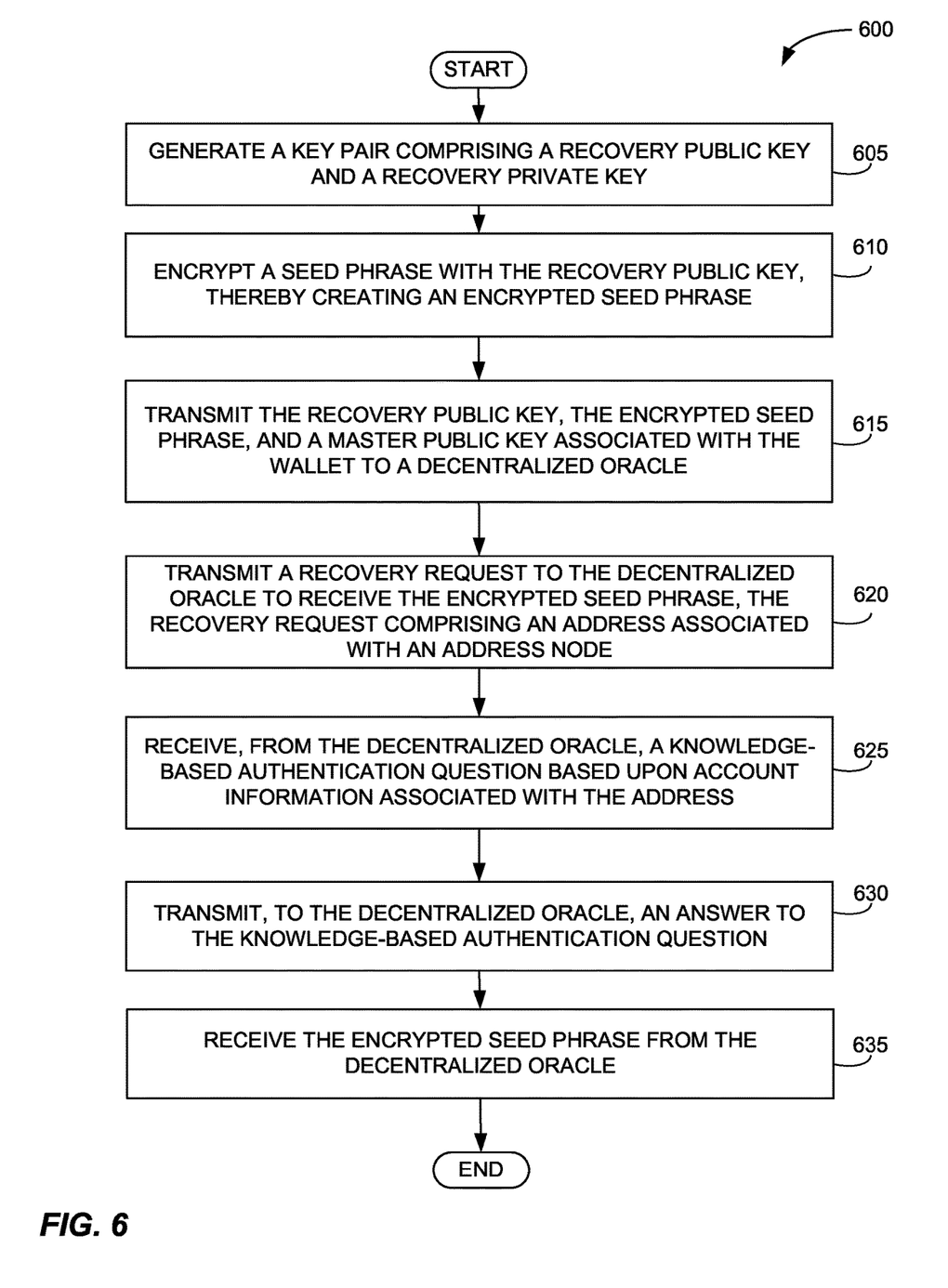
FIG. 6 is a flowchart of an example method for recovering access to a wallet, according to the present disclosure.

FIG. 6 is a flowchart of an example method 600 for recovering access to a wallet, according to the present disclosure. Method 600 can be performed in whole or in part by the components of the user device 102, for example processor 302, memory 304, operating system ("OS") 306, one or more programs (e.g., mobile application 350 described herein). Method 600 can include generating 605 a key pair comprising a recovery public key and a recovery private key. The device 102 can encrypt 610 a seed phrase with the recovery public key, thereby creating an encrypted seed phrase. The device 102 can transmit 615 the recovery public key, the encrypted seed phrase, and a master public key associated with the wallet to a decentralized oracle 110. Steps 605 to 615 can be considered an initialization phase of method 600, wherein the user of the user device 102 intends to use the decentralized oracle 110 to maintain an encrypted version of the seed phrase in case the user loses or forgets his or her seed phrase.

The remaining steps of method 600 can include a request from the user device 102 to retrieve the seed phrase, as though the user has lost or forgotten the seed phrase. The device 102 can transmit 620 a recovery request to the decentralized oracle 110 to receive the encrypted seed phrase. The recovery request can include an address associated with an address node of the wallet. The device 102 can receive 625 a knowledge-based authentication question from the decentralized oracle 110, the question being based upon account information associated with the address. The device 102 can transmit an answer to the knowledge-based authentication question back to the decentralized oracle 110. The knowledge-based authentication question or questions can be similar to the questions described above with reference to FIGS. 4A and 5. If the answer is correct, or is within the predetermined ranges of being considered correct by the oracle, as described above, the user device 102 can receive 635 the encrypted seed phrase.

Method 600 can end after the receive 635 step, or other method steps can be included. For example, the user device 102 can decrypt the encrypted seed phrase using the recovery private key. Once the seed phrase is decrypted, the user can then access assets within the wallet using the seed phrase.

Referring again to the system environment 100 described in FIG. 1, the decentralized oracle 110 can include one or more processors 112, a memory 114, and data storage, for example in database 120. The processor 112 can include one or more of a microprocessor, microcontroller, digital signal processor, co-processor or the like or combinations thereof capable of executing stored instructions and operating upon stored data.

The memory 114 of the decentralized oracle 110 can include, in some implementations, one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data.

The memory 114 of the decentralized oracle 110 can contain an operating system ("OS") 116 that can run one or more programs 118. The one or more programs 118 can perform one or more functions of the disclosed examples. The one or more programs 118 can include, for example, a program for creating oracle private/public key pairs, receiving recovery requests, and operating the application 350 described herein.

The memory 114 can also include any combination of one or more databases, including for example database 120, controlled by memory controller devices (e.g., server(s), etc.) or software, such as document management systems, Microsoft® SQL databases, SharePoint® databases, Oracle® databases, Sybase® databases, or other relational databases.

The decentralized oracle 110 can include a communication interface 122 for communicating with external systems or internal systems. The communication interface 122 can include a serial port, a parallel port, a general-purpose input and output (GPIO) port, a game port, a universal serial bus (USB), a micro-USB port, a high definition multimedia (HDMI) port, a video port, an audio port, a Bluetooth™ port, an NFC port, another like communication interface, or any combination thereof. The communication interface 122 can include a transceiver 124 to communicate with compatible devices, for example via short range, long range (e.g., cellular, local area networks (LAN), wide area networks (WAN), etc.), or similar technologies that enables the decentralized oracle 110 to communicate via the network 108 described herein.

While the present disclosure has been described in connection with a plurality of exemplary aspects, as illustrated in the various figures and discussed above, it is understood that other similar aspects can be used, or modifications and additions can be made, to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

The components described in this disclosure as making up various elements of the systems and methods are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

Examples of the present disclosure can be implemented according to at least the following clauses:

Clause 1: A method for recovering access to a wallet, the method comprising: receiving, at one or more processors associated with a decentralized oracle, a recovery request from a device to store a wallet private key and/or a seed phrase associated with the wallet; storing, in a database associated with the decentralized oracle, the wallet private key and/or the seed phrase; generating, by a random number generator associated with the one or more processors, an oracle private key associated with the wallet; transmitting, from the one or more processors, the oracle private key to the device; receiving, from the device and at the one or more processors, a recovery request to receive the wallet private key and/or the seed phrase, the recovery request comprising the oracle private key; accessing, by the one or more processors, a decentralized ledger comprising data indicative of activity of the wallet; identifying, by the one or more processors, account information associated with one or more transactions completed by the wallet; transmitting, from the one or more processors and to the device, a request for confirmation that a client associated with the wallet completed the one or more transactions; receiving, from the device and at the one or more processors, a confirmation that the client completed the one or more transactions; and transmitting, from the one or more processors and to the device, the wallet private key and/or the seed phrase in response to the confirmation.

Clause 2: The method of Clause 1, further comprising: generating, by the one or more processors, an oracle public key for storage on the device; and encrypting, by the one or more processors, the wallet private key and/or the seed phrase prior to transmitting same to the device, wherein an encrypted wallet private key and/or an encrypted seed phrase is configured to be decrypted using the oracle public key.

Clause 3: The method of Clause 1 or 2, further comprising receiving, at the one or more processors, a master public key associated with the wallet along with the recovery request, wherein identifying information associated with one or more transactions completed by the wallet comprises identifying addresses associated with the wallet via the master public key.

Clause 4: The method of any of Clauses 1 to 3, further comprising generating, by the one or more processors, a key pair comprising a recovery private key and a recovery public key, wherein the recovery request comprises an encrypted version of the wallet private key and/or the seed phrase encrypted using the recovery public key.

Clause 5: The method of Clause 4, further comprising receiving, at the one or more processors, a master public key associated with the wallet along with the recovery request, wherein the recovery request comprises the encrypted version of the wallet private key and/or the seed phrase.

Clause 6: The method of any of Clauses 1 to 5, further comprising: receiving, at the one or more processors, wallet assets associated with the wallet; and deducting, by the one or more processors, recovery assets from the wallet assets responsive to transmitting the wallet private key and/or the seed phrase, wherein the wallet private key and/or the seed phrase is transmitted to the device responsive to determining the wallet assets are over a predetermined threshold.

Clause 7: The method of any of Clauses 1 to 6, wherein: the request for confirmation comprises a knowledge-based authentication question based upon the account information; the confirmation comprises an answer to the knowledge-based authentication question; and the method further comprises comparing, by the one or more processors, the answer with the account information, the wallet private key and/or the seed phrase being transmitted to the device in response to determining that the answer matches the account information.

Clause 8: The method of Clause 7, wherein: the account information of the knowledge-based authentication question comprises at least one of a total asset amount for the wallet, a total amount of a cryptocurrency within the wallet, a fiat currency value amount for assets in the wallet, information related to recent traded currency pairs, or information related to recent transaction types.

Clause 9: The method of Clause 8, further comprising: receiving, from the device and at the one or more processors, a predetermined range for comparing the answer with the account information, wherein the predetermined range is a degree of tolerance between the answer and the total asset amount for the wallet, the total amount of a cryptocurrency within the wallet, or the fiat currency value amount for assets in the wallet.

Clause 10: A method for recovering access to a wallet, the method comprising: receiving, at one or more processors associated with a decentralized oracle, a recovery public key, an encrypted seed phrase, and a master public key associated with the wallet, the encrypted seed phrase being encrypted with the recovery public key; storing, in a database associated with the decentralized oracle, the recovery public key, the master public key, and the encrypted seed phrase; receiving, at the one or more processors, a recovery request from a device to receive the encrypted seed phrase, the recovery request comprising an address associated with an address node; accessing, by the one or more processors, a decentralized ledger comprising data indicative of activity of the wallet; identifying, by the one or more processors, account information associated with the address; transmitting, from the one or more processors and to the device, a knowledge-based authentication question based upon the account information; receiving, from the device and at the one or more processors, an answer to the knowledge-based authentication question; comparing, by the one or more processors, the answer with the account information; and transmitting, from the one or more processors, the encrypted seed phrase to the device.

Clause 11: The method of Clause 10, wherein the device operates an oracle application associated with the decentralized oracle, wherein the recovery public key is associated with a recovery private key generated by the oracle application, and wherein the encrypted seed phrase is configured to be decrypted by the recovery private key.

Clause 12: The method of Clause 10 or 11, further comprising: receiving, at the one or more processors, wallet assets associated with the wallet; and deducting, by the one or more processors, recovery assets from the wallet assets responsive to transmitting the encrypted seed phrase to the device.

Clause 13: The method of Clause 12, further comprising: determining, by the one or more processors, that the wallet assets are below a predetermined threshold; transmitting, from the one or more processors, a notification to the device indicating additional assets are required to transmit the encrypted seed phrase; and receiving, at the one or more processors, the additional assets prior to transmitting the encrypted seed phrase to the device.

Clause 14: The method of any of Clauses 10 to 13, wherein: the account information of the knowledge-based authentication question comprises at least one of a total asset amount for the wallet, a total amount of a cryptocurrency within the wallet, a fiat currency value amount for assets in the wallet, information related to recent traded currency pairs, or information related to recent transaction types.

Clause 15: The method of Clause 14, further comprising: receiving, from the device and at the one or more processors, a predetermined range for comparing the answer with the account information, wherein the predetermined range is a degree of tolerance between the answer and the total asset amount for the wallet, the total amount of a cryptocurrency within the wallet, or the fiat currency value amount for assets in the wallet.

Clause 16: A method for recovering access to a wallet, the method comprising: generating, by one or more processors of a device, a key pair comprising a recovery public key and a recovery private key; encrypting, by the one or more processors, a seed phrase with the recovery public key, thereby creating an encrypted seed phrase; transmitting, from the one or more processors, the recovery public key, the encrypted seed phrase, and a master public key associated with the wallet to a decentralized oracle; transmitting, from the one or more processors, a recovery request to the decentralized oracle to receive the encrypted seed phrase, the recovery request comprising an address associated with an address node; receiving, at the one or more processors and from the decentralized oracle, a knowledge-based authentication question based upon account information associated with the address; transmitting, from the one or more processor and to the decentralized oracle, an answer to the knowledge-based authentication question; and receiving, at the one or more processors, the encrypted seed phrase from the decentralized oracle.

Clause 17: The method of Clause 16, further comprising: decrypting the encrypted seed phrase using the recovery private key; and accessing assets within the wallet using the seed phrase.

Clause 18: The method of Clause 16 or 17, further comprising operating, by the one or more processors, an oracle application associated with the decentralized oracle, and wherein the key pair is generated by the oracle application.

Clause 19: The method of Clause 18, further comprising encrypting, by the one or more processors, the master public key using the recovery public key prior to transmitting the master public key to the decentralized oracle.

Clause 20: The method of any of Clauses 16 to 19, wherein: the account information of the knowledge-based authentication question comprises at least one of a total asset amount for the wallet, a total amount of a cryptocurrency within the wallet, a fiat currency value amount for assets in the wallet, information related to recent traded currency pairs, or information related to recent transaction types; and the method further comprises transmitting, from the one or more processors and to the decentralized oracle, a predetermined range for comparing the answer with the account information, wherein the predetermined range is a degree of tolerance between the answer and the total asset amount for the wallet, the total amount of a cryptocurrency within the wallet, or the fiat currency value amount for assets in the wallet.

Exemplary Use Cases

The following exemplary use cases describe examples of a typical user flow pattern. They are intended solely for explanatory purposes and not limitation.

Tim is a cryptocurrency trader, who, after a few years of trading on the blockchain, has digital assets worth around US $100,000 within his crypto wallet. He trades a few times a month by logging into his wallet using his seed phrase. However, with the amount of assets in his wallet, he wants to ensure that he never loses access to his wallet, i.e., by losing his seed phrase. He downloads a mobile application to his device related to a decentralized oracle that can assist him in storing and maintaining his seed phrase should he need to retrieve it in the future. Once the mobile application is downloaded, Tim enters his seed phrase into the application and transmits the seed phrase to the decentralized oracle for storage. The oracle, in turn, creates an oracle private key to associate with Tim's wallet, and the oracle sends the oracle private key for Tim to store on his device.

Time passes, and Tim forgets his seed phrase, so he wants to recover the phrase from the oracle. He transmits a recovery request, using the mobile application, to the oracle to receive the seed phrase. The recovery request includes the oracle private key transmitted to Tim's device. The oracle reviews transaction addresses associated with Tim's wallet to identify prior transactions that can be used to authenticate Tim. The oracle identifies a transaction from 2 weeks prior where Tim purchased $2,125 worth of CryptoCurrency X. The oracle then transmits a knowledge-based authentication question to Tim's device asking if Tim made a purchase within the past 2 weeks for CryptoCurrency X. Tim knows he did, so he answers in the affirmative within the mobile application. The oracle sends a follow up question asking whether Tim purchased approximately $150 worth of CryptoCurrency X. Tim knows the amount was significantly more than that, so answers "no" in the mobile application. The oracle confirms this information as correct, and transmits the seed phrase to Tim's mobile device.

In the same hypothetical as above, instead of answering yes/no questions, the oracle is configured to ask open-ended questions about prior transactions associated with the wallet. The oracle asks Tim, "What was the fiat currency value of the most recent purchase of CryptoCurrency X." Tim knows it was around $2,000, so he enters the answer "$2,000" in the mobile application. The oracle in this example has a 10% threshold rule for questions involving value, meaning Tim can provide any answer within a 10% range of $2,125 and it will be considered correct. Since $2,000 is within the 10% threshold of $2,125, the oracle confirms this information as correct, and transmits the seed phrase to Tim's mobile device.

In the same hypothetical as above, the oracle requires a certain amount of funds in order to release the seed phrase to Tim. To receive those funds, the oracle requires Tim to allocate a certain amount of funds, which are to be held in escrow by the oracle until Tim needs phrase recovery. Therefore, to initiate the backup procedure, Tim moves $200 worth of CryptoCurrency X over into an address owned by the oracle. When Tim requests the seed phrase, the oracle deducts $100 worth of the cryptocurrency before transmitting the seed phrase. The oracle requires at least $150 worth of assets in the escrow in order to remain active (e.g., to continue saving Tim's seed phrase), so the seed phrase is sent to Tim along with a request to upload more assets should Tim wish to use the oracle in the future.

In another example, Sheila is another cryptocurrency trader with considerable assets within her wallet. Knowing she would benefit from a backup system that stores her seed phrase should she need it, she signs up for a decentralized oracle service. She downloads a mobile application related to the decentralized oracle that can assist her in storing and maintaining her seed phrase should he need to retrieve it in the future. Once the mobile application is downloaded, Sheila enters her seed phrase into the application. The mobile application then encrypts the seed phrase, generates a recovery public key, and transmits, via Sheila's device, the encrypted seed phrase, recovery public key, and a master public key to the oracle for storage.

Time passes, and Sheila forgets her seed phrase, so she wants to recover the phrase from the oracle. She transmits a recovery request to the oracle, and the oracle accesses prior transactions from Sheila's wallet using the master public key associated with her wallet. It asks Sheila questions about her account, to which she answers in the mobile application, and the oracle transmits the encrypted seed phrase back to Sheila's device. Her device then decrypts the seed phrase using a recovery private key generated by the application that pairs to the recovery public key, and she logs into her wallet.

What is claimed is:

1. A method for recovering access to a wallet, the method comprising:
   generating, by one or more processors of a device, a key pair comprising a recovery public key and a recovery private key;
   encrypting, by the one or more processors, a seed phrase with the recovery public key, thereby creating an encrypted seed phrase;
   transmitting, from the one or more processors, the recovery public key, the encrypted seed phrase, and a master public key associated with the wallet to a decentralized oracle;
   transmitting, from the one or more processors, a recovery request to the decentralized oracle to receive the encrypted seed phrase, the recovery request comprising an address associated with an address node;
   receiving, at the one or more processors and from the decentralized oracle, a knowledge-based authentication question based upon account information associated with the address;
   transmitting, from the one or more processor and to the decentralized oracle, an answer to the knowledge-based authentication question and a predetermined range for comparing the answer with the account information; and
   receiving, at the one or more processors, the encrypted seed phrase from the decentralized oracle.

2. The method of claim 1, further comprising:
   decrypting the encrypted seed phrase using the recovery private key; and
   accessing assets within the wallet using the seed phrase.

3. The method of claim 1, further comprising operating, by the one or more processors, an oracle application associated with the decentralized oracle, and wherein the key pair is generated by the oracle application.

4. The method of claim 3, further comprising encrypting, by the one or more processors, the master public key using the recovery public key prior to transmitting the master public key to the decentralized oracle.

5. The method of claim 1, wherein:
   the account information of the knowledge-based authentication question comprises at least one of a total asset amount for the wallet, a total amount of a cryptocurrency within the wallet, a fiat currency value amount for assets in the wallet, information related to recent traded currency pairs, or information related to recent transaction types; and the predetermined range is a degree of tolerance between the answer and the total asset amount for the wallet, the total amount of a cryptocurrency within the wallet, or the fiat currency value amount for assets in the wallet.

6. A system for recovering access to a wallet, the system comprising:
- one or more processors; and
- a memory in communication with the one or more processors and storing instructions that, when executed by the one or more processors, are configured to cause the system to:
  - generate a key pair comprising a recovery public key and a recovery private key;
  - encrypt a seed phrase with the recovery public key, thereby creating an encrypted seed phrase;
  - transmit the recovery public key, the encrypted seed phrase, and a master public key associated with the wallet to a decentralized oracle;
  - transmit a recovery request to the decentralized oracle to receive the encrypted seed phrase, the recovery request comprising an address associated with an address node;
  - receive, from the decentralized oracle, a knowledge-based authentication question based upon account information associated with the address;
  - transmit, to the decentralized oracle, an answer to the knowledge-based authentication question and a predetermined range for comparing the answer with the account information; and
  - receive the encrypted seed phrase from the decentralized oracle.

7. The system of claim 6, wherein the instructions further cause the system to:
- decrypting the encrypted seed phrase using the recovery private key; and
- accessing assets within the wallet using the seed phrase.

8. The system of claim 6, wherein the instructions further cause the system to operate an oracle application associated with the decentralized oracle, and wherein the key pair is generated by the oracle application.

9. The system of claim 8, wherein the instructions further cause the system to encrypt the master public key using the recovery public key prior to transmitting the master public key to the decentralized oracle.

10. The system of claim 6, wherein:
- the account information of the knowledge-based authentication question comprises at least one of a total asset amount for the wallet, a total amount of a cryptocurrency within the wallet, a fiat currency value amount for assets in the wallet, information related to recent traded currency pairs, or information related to recent transaction types; and
- the predetermined range is a degree of tolerance between the answer and the total asset amount for the wallet, the total amount of a cryptocurrency within the wallet, or the fiat currency value amount for assets in the wallet.

* * * * *